Aug. 8, 1950         J. F. DEMARK              2,517,770
            INDEXING CENTER WORK SUPPORT
Filed June 19, 1947                      2 Sheets-Sheet 1
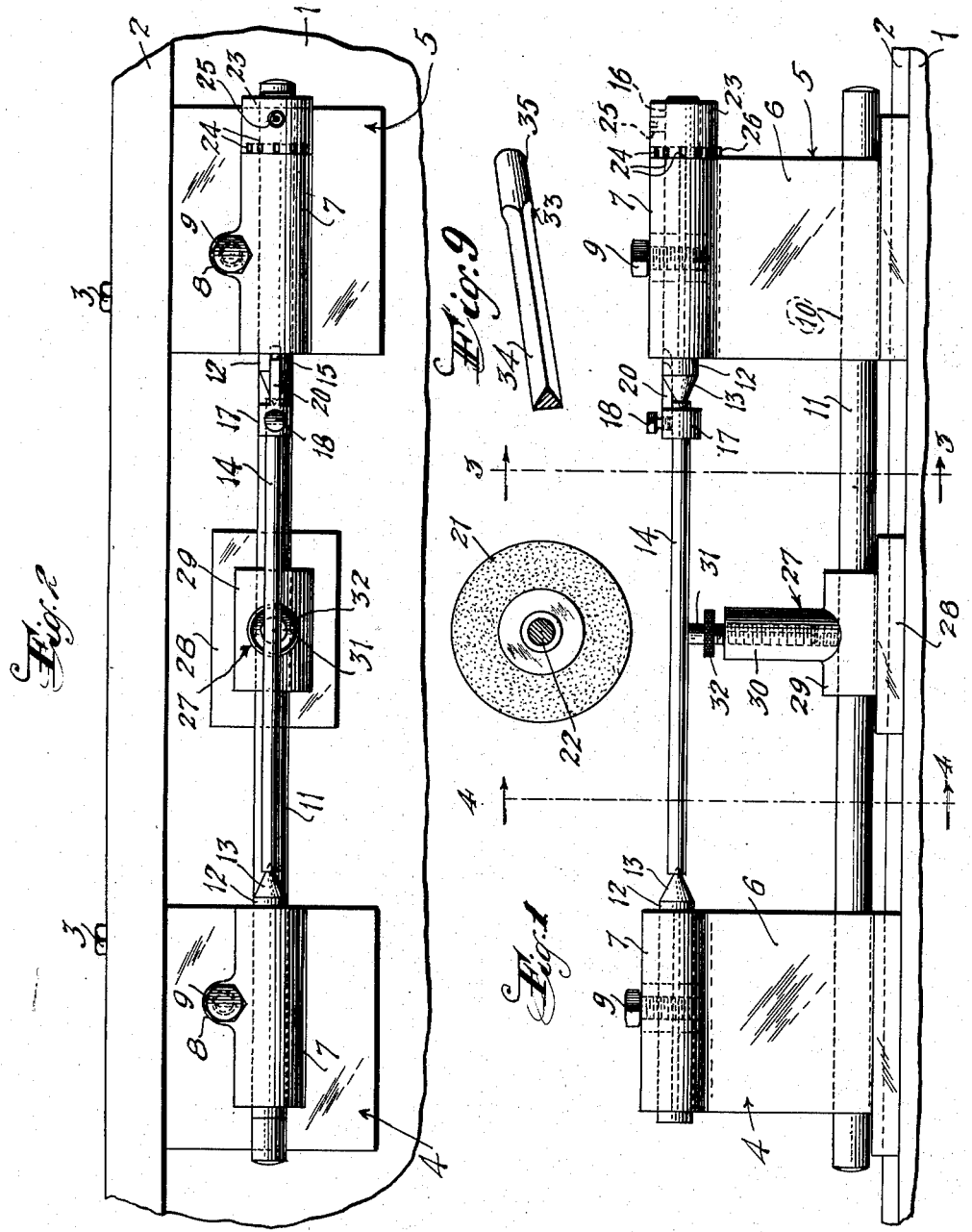

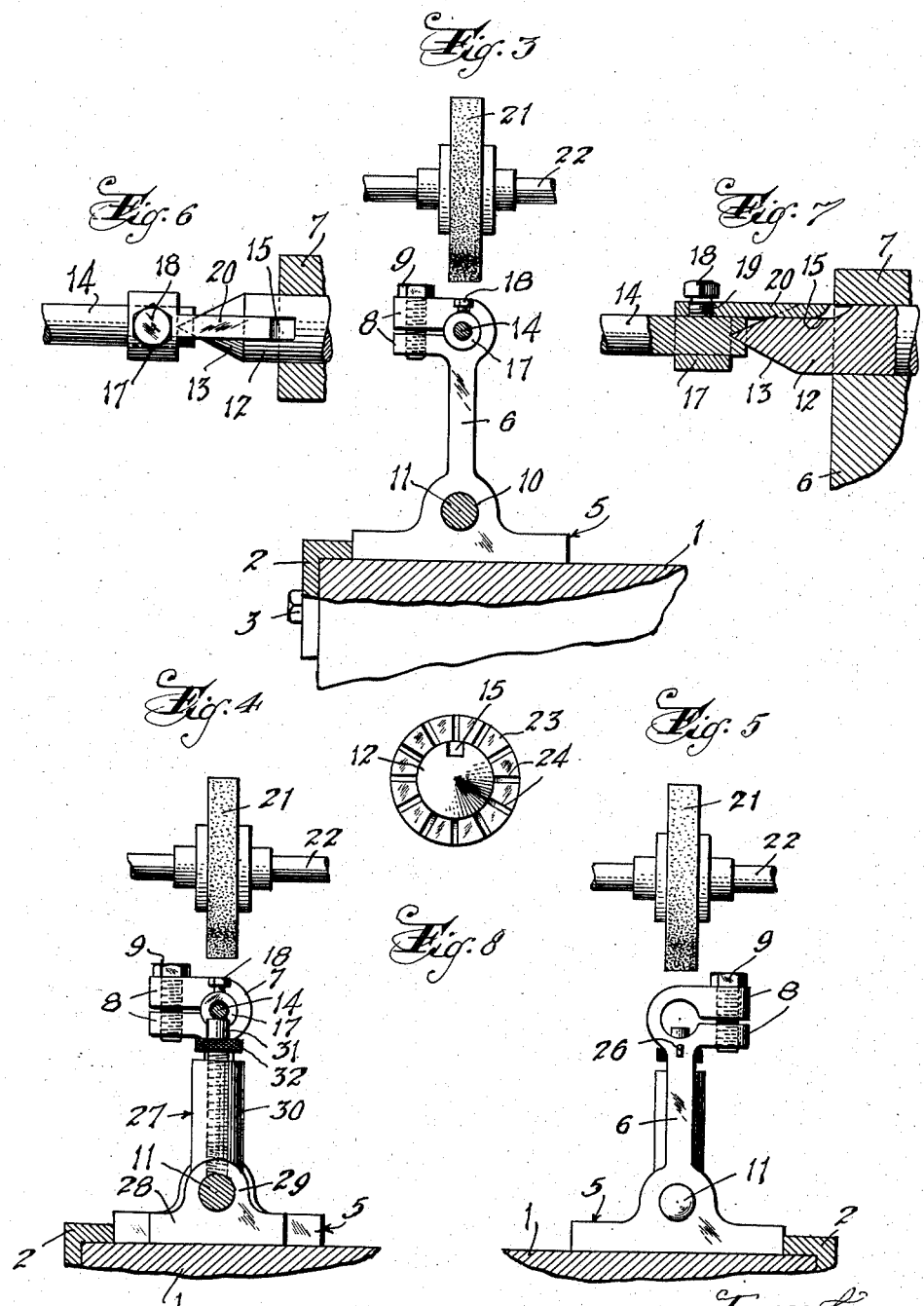

Patented Aug. 8, 1950

2,517,770

UNITED STATES PATENT OFFICE 2,517,770

INDEXING CENTER WORK SUPPORT

Joseph F. Demark, Belleville, N. J.

Application June 19, 1947, Serial No. 755,639

4 Claims. (Cl. 51—216)

This invention relates generally to apparatus for supporting and indexing work on centers in position for grinding operations thereon and a prime object of the present invention is to provide a novel and improved indexing work support whereby the work can be rotated on centers to present different portions thereof to a grinding wheel so that rods or pins of various lengths can be ground accurately and easily into various cross-sectional shapes.

Another object is to provide a work support with means for supporting the work piece at both ends and intermediate its ends so as to accommodate unusually long pieces such as slender rods and prevent flexing thereof under the pressure of the grinding wheel.

A further object is to provide an indexing device that is simple, inexpensive, highly efficient and accurate in use, and easy to assemble and disassemble.

Other objects and advantages of the invention will be apparent from the description thereof to follow taken in conjunction with the accompanying drawings in which—

Figure 1 is a side view of my improved indexing attachment associated with a pin supported on a chuck preparatory to grinding operations thereon.

Figure 2 is a top plan view of the apparatus shown in Figure 1 with the grinding wheel omitted.

Figure 3 is a cross-sectional view taken on the plane of the line 3—3 of Figure 1.

Figure 4 is a cross-sectional view taken on the plane of the line 4—4 of Figure 1.

Figure 5 is an end view looking from the right-hand end of Figure 1 with the indexing attachment and centering pin omitted.

Figure 6 is an enlarged fragmentary top plan view showing the connection between the right-hand centering pin and the work piece.

Figure 7 is an enlarged side view thereof in section.

Figure 8 is an end view of the right-hand centering pin with the indexing attachment mounted thereon.

Figure 9 is a fragmentary perspective view of a typical pin capable of being produced by the improved apparatus.

Referring to the drawings, I have shown my improved apparatus mounted on a chuck 1 formed of magnetizable metal and adapted to be connected to a source of electric current for magnetizing the same. A flanged guide plate 2 is suitably fastened along one edge of the top surface of the chuck by bolts 3, the flange resting on the top surface of the chuck. Two pedestals 4 and 5 are mounted on the flat top surface of the chuck in spaced relation, each comprising a vertically extending web 6 terminating at its upper end in a split sleeve portion 7 having aligned perforated ears 8 midway its ends, for receiving a threaded bolt 9. The base portion of each pedestal has a flat bottom surface to slidably engage the top surface of the chuck, the pedestal having no other mechanical connection with the chuck. Each pedestal also is formed with an opening 10 extending therethrough for loosely receiving a cylindrical bar 11 so that said pedestals are connected by said bar and can be freely moved toward and from each other.

Clamped in each split sleeve is a centering pin 12 having a pointed end 13, the pointed ends projecting outside of the sleeves and being disposed in opposed relation for supporting the conical grooved ends of a work piece, such as a pin or rod 14 which is to be ground or shaped to the desired shape in cross-section, such as triangular, square, hexagonal or the like. The centering pin supported by pedestal 5 is longer than the other centering pin and is formed with a keyway or slot 15 at its pointed end and with a flat portion 16 at its opposite end. The work piece 14 is held against rotation relative to the centering pins 12 by a dog or holding sleeve 17 mounted on the end of the work piece and made fast thereto by a locking bolt 18 passing through a threaded opening 19 in said sleeve. An integral finger 20 projecting from one end of said sleeve 17 extends into the keyway 15 and coacts with the walls thereof to prevent rotation of the work piece relative to the adjacent centering pin.

The grinding operation is performed by a grinding wheel 21 shown on a rotatable shaft 22 above the work piece 14. It will be understood that the grinding wheel may be lowered into operative grinding relation with the work piece by any suitable mechanism (not shown) or the work piece may be raised to operative grinding relation by suitable mechanism (not shown).

The indexing mechanism proper comprises a sleeve member or indexing member 23 mounted on the outer protruding end of the centering pin 12 on pedestal 5 and adapted to be angularly moved therearound. The inner face of this member 23, as viewed in Figure 1, is formed with a series of indexing slots 24 extending through the periphery thereof. These slots are suitably spaced to conform to the desired position of the work piece 14. Sleeve member 23 is held against movement on its centering pin 12 by a set screw 25 extending therethrough and engaging the flat portion 16 of said pin. On one end of the web portion 6 of pedestal 5 adjacent its sleeve portion 7 is a projection or stud 26 adapted to engage in one of said indexing slots 24.

In use, the work piece 14 is mounted between the pedestals on the centering pins and such parts with the bar 11 extending through the pedestals are mounted as a unit on the top surface of the chuck. The work piece is brought into true parallelism with the grinding wheel 21 by aligning the edges of the pedestals with the guiding flange of plate 2 as shown in Figure 2 which is easily accomplished by sliding the pedestals on the top surface of the chuck into abutting contact with said flange. When the parts are thus properly positioned, the chuck is connected to a source of electric current whereby it becomes magnetized and through magnetism holds the pedestals in fixed position. Assuming that a portion of the periphery of the work piece 14 has been completely ground and it is desired to present another portion of the periphery thereof to the grinding wheel, the bolt 9 of pedestal 5 is loosened, and indexing finger piece 23 moved outwardly to disengage it from the stud 26, the work being supported by the finger 20 of the dog 17 in the groove 15 of the center pin. The sleeve member 23, pin 12 and work piece are then turned as a unit through the desired angle and until a slot 24 is in alignment with the stud 26. The finger piece 23 is then moved inwardly to bring the aligned slot into interlocking relation with the stud, after which the bolt 9 is tightened to hold the center pin and work in adjusted position. If desired the indexing finger piece and pedestal may be graduated to indicate degrees of rotation or otherwise.

In case additional support is needed for the work piece because of its length or for any other reason, another pedestal 27 may be provided and positioned on bar 11 between the pedestals 4 and 5. Pedestal 27 includes a base portion 28, a horizontally disposed sleeve portion 29 for loosely receiving the bar 11 and a vertically disposed internally screw-threaded sleeve portion 30 for receiving a screw member 31 having a knurled finger piece 32 adjacent its upper end for moving the screw member up and down. The upper end of the screw member is adapted to engage the lower surface of the work piece 14 and thereby provide additional rigidity to the structure and prevent sagging of the work piece.

In Figure 9 is shown a sample of work resulting from use of the apparatus disclosed herein. This sample comprises a pin or rod 33 which has an angular body portion 34 and a cylindrical end portion 35 which was held in the dog 17. It will be understood that the improved apparatus is capable of shaping the body portion 34 to any desired shape in cross-section.

While I have shown and described the now preferred embodiment of my invention, it will be understood that many modifications and changes in the details of construction of the device may be made by those skilled in the art within the spirit and scope of the invention.

What I claim is:

1. In work supporting apparatus for a grinding machine having a grinding wheel, the combination of a chuck of magnetizable material having a flat top surface and a guide flange projecting upwardly from said surface, a pair of portable spaced pedestals, a bar on which said pedestals are slidably mounted for movement toward and from each other, pointed pins supported on said pedestals for holding a work piece between them, at least one of said pins being rotatable in its pedestal, means for connecting said rotatable pin to a piece of work to cause rotation of the work with the pin, and means for holding said pin against rotation and longitudinal movement, each pedestal having a flat bottom surface to slidably engage said top surface of said chuck and being otherwise unconnected mechanically to said chuck so that the pedestals may slide freely in any direction on said chuck surface, and each pedestal also having a portion to abut said flange for positioning said work piece in proper relation to the grinding wheel.

2. In work supporting apparatus for a grinding machine as defined in claim 1, a third pedestal slidable on said bar between the first-mentioned pair of pedestals and having a flat bottom surface to slidably engage said top surface of the chuck and being otherwise unconnected mechanically to said chuck so as to freely slide in any direction on the chuck surface, said third pedestal also having an adjustable member to underlyingly abut and support said work piece intermediate its ends.

3. A work support for a grinding machine comprising a pair of portable spaced pedestals, a bar on which said pedestals are slidably mounted for movement toward and from each other, pointed pins supported on said pedestals for holding a piece of work between them, at least one of said pins being rotatable in its pedestal, means for connecting said pin to a piece of work to cause rotation of the work with the pin, means for holding said pin against rotation and longitudinal movement, each pedestal having a flat bottom surface to slidably engage the flat top surface of a magnetic chuck and also having a portion to abut a projection on such magnetic chuck for positioning the work piece in proper relation to a grinding wheel.

4. A work support for a grinding machine as defined in claim 3 with the addition of a member fixed on said one of said pins, one of said members and the pedestal that carries said pin having a stud and the other having slots to receive said stud for indexing the position of the work piece supported by said pins.

JOSEPH F. DEMARK.

REFERENCES CITED

The following references are of record in the file of this patent:

UNITED STATES PATENTS

| Number | Name | Date |
|---|---|---|
| 500,494 | Harris | June 27, 1893 |
| 667,230 | Landis | Feb. 5, 1901 |
| 726,458 | Purper et al. | Apr. 28, 1903 |
| 1,133,064 | Schellenbach | Mar. 23, 1915 |
| 1,326,423 | Rennie | Dec. 30, 1919 |
| 2,116,135 | Bath | May 3, 1938 |
| 2,347,616 | Stephenson | Apr. 25, 1944 |
| 2,456,060 | Hoern et al. | Dec. 14, 1948 |